Figure 1:
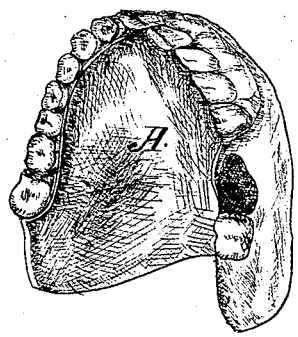
Figure 2:
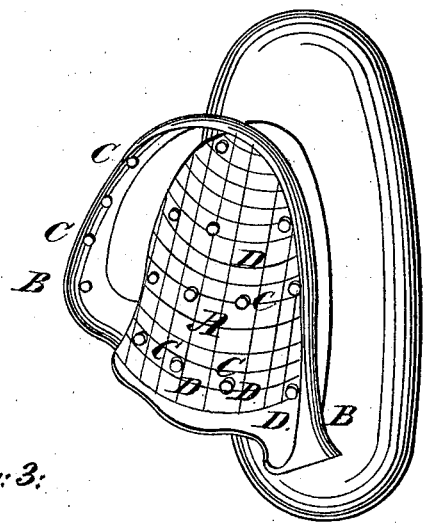
Figure 3:
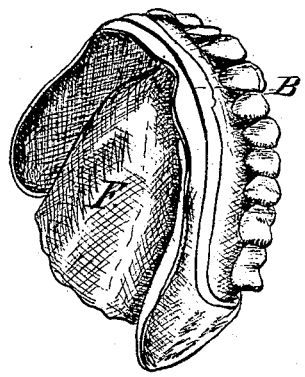

G. W. Tripp,
Plate for Artificial Teeth.
Nº 39,434. Patented Aug. 4, 1863.

Witnesses:
E. G. Stoike
Horace J. Cook

Inventor.
George W. Tripp

UNITED STATES PATENT OFFICE.

GEORGE W. TRIPP, OF AUBURN, NEW YORK.

IMPROVEMENT IN DENTAL PLATES.

Specification forming part of Letters Patent No. 39,434, dated August 4, 1863; antedated February 7, 1863.

*To all whom it may concern:*

Be it known that I, GEORGE W. TRIPP, of Auburn, in the county of Cayuga and State of New York, have invented a new and useful method of lining or covering ordinary vulcanized rubber dental plates with gold or other proper metal, for the purpose of giving to such plates greater durability and efficiency; and I do hereby declare the following to be a full and exact description of the construction and use of the same, reference being had to the annexed drawings, making a part of this specification, in which—

Figure I represents an ordinary rubber dental plate, the concave surface of which is covered with a gold plate or lining, A, which gold plate is separately represented in Fig. II. Said gold or lining plate is made substantially in the form represented in said Fig. II.

My invention consists in covering or lining an ordinary rubber dental plate, substantially as represented in said Fig. I, with gold or other suitable metal. I unite or attach the said metallic plate to the said rubber by any or all of the following methods—namely, by the concave circular band B, Fig. II, by the spherical segments C, Fig. II, soldered at their base to and projecting from the convex surface of the said plate A, as represented in said Fig. II, and by the incisions or cuts D made in the surface of the said plate A, as represented thereon in Fig. II. The concave circular band B not only aids in securing the contact between the metallic lining-plates and the rubber base, but it gives greater firmness to the entire plate and ornaments and finishes the work. The adhesion between the rubber and the said plate A is further secured by the spherical segments C and the said incisions or cuts D, the vulcanized rubber in its plastic state being forced by pressure with those cuts D, and around those spherical segments C solidifies and forms a firm and perfect connection between the gold lining and rubber base, however thin the former may be.

F, Fig. III, is a representation of the rubber surface opposite to that shown at A, Fig. I.

The utility of the device will appear from the following: By it a common rubber dental plate is made of even greater value and efficiency than a plate made exclusively of either gold or rubber, and at much less cost than the former The union of metal and gum in forming the plate, as specified herein, gives greater strength than by the use of either separately, while the combination gives all the accuracy and perfection in the fitting of the plates to the mouth which are obtained by the use of rubber, and all the cleanliness and durability obtained by the use of metals.

Similar letters of reference indicate corresponding parts in each of the several figures.

What I claim as new, and desire to secure by Letters Patent, is—

1. The lining, coating, or covering of vulcanized rubber or other vulcanized gums, when the same are used in dental plates, with a plating of gold or other suitable metal, substantially in the manner and for the uses specified.

2. The concave band B, Fig. II, substantially as and for the purpose specified.

3. In combination with the gum and metallic plates, the spherical segments C and the incisions D, as set forth.

GEORGE W. TRIPP.

Witnesses:
E. G. STORKE,
H. T. COOK.